June 11, 1968 H. C. HARBERS, JR 3,387,858
VEHICLE SUSPENSION
Filed Dec. 27, 1965 5 Sheets-Sheet 1

Fig. 1

INVENTOR.
Henry C. Harbers, Jr.
BY Warren, Brosler, Cypher
and Anglim Attorneys

Fig. 2

INVENTOR.
Henry C. Harbers, Jr.

3,387,858
VEHICLE SUSPENSION
Henry C. Harbers, Jr., 17747 E. Railroad Ave.,
City of Industry, Calif. 91744
Filed Dec. 27, 1965, Ser. No. 516,583
11 Claims. (Cl. 280—124)

ABSTRACT OF THE DISCLOSURE

A vehicle suspension system which is adaptable to support of the vehicle frame relative to the axle and for support of a fifth wheel structure is disclosed. The system is constructed by anchoring a laterally flexible member, such as a cable or flat strip or band of material, for operation in tension upon loading medially thereof. The anchorage is resiliently yieldable and preferably constructed with a coil spring and rubber block to provide a spring constant which varies as deflection of the cable and thus the anchorage increases. The combined deflection characteristics of the cable and the anchorage determine the suspension characteristics. The system may also include an energy dissipator such as a shock absorber or a second cable mounted to oppose the first cable.

---

The invention relates in general to vehicle suspension systems, e.g. to axle suspensions for wheeled vehicles and fifth wheel suspensions for trucks.

Cars, trucks and trains have heretofore employed linear suspension systems, that is, standard leaf or helical springs wherein the deflection is substantially constant for any increment of vehicle load. These linear springs are quite suitable for vehicles where the loaded weight is substantially the same as the unloaded weight, such as is the case in most automobiles. An automobile will have an empty weight of about 3,000 lbs. and a loaded weight of 3,500 to 3,600 lbs. which is an increase of only about 20%. Typically, an automobile is provided with coil springs which have a deflection of about 8 inches unloaded and about 9 inches loaded which results in a decrease in the natural frequency of the mass of the car, as spring supported from the ground, of about 6%. As so suspended, cars have a natural frequency in the range of 60 to 70 cycles per minute which is relatively low and highly desirable. On a concrete highway, for example, with dividers or expansion strips in standard spaced relationships along the highway, a car travelling 60 miles per hour will receive impulses from these divider strips on the order of 350 cycles per minute. As this is much higher than the natural frequency of the car, there is a minimum tendency for resonance between the ground impulses and the frequency of the automobile which would cause galloping or excessive bounce of the vehicle. Other common irregularities on the highway are similarly of much higher frequency than the natural frequency of most automobiles and therefore will not cause resonance. Moreover, because the automobile springs have experienced an 8-in. deflection in unloaded condition and undergo a further 1-in. deflection when loaded, the ride of the passenger car when going over bumps is relatively soft.

The trucking industry is faced with a much more difficult problem as the loaded weight of a truck is significantly more than the unloaded weight. For example, a truck may have an unloaded or empty weight of about 4,000 lbs. per axle and a loaded weight of about 17,000 per axle, which is an increase in loading of about 400%. Such an increase in truck mass will result in a corresponding change, decrease, in the natural frequency of a truck of about 200% which is desirable, but the unloaded ride is very poor. Trucks have heretofore been provided with coil or leaf springs in order to suspend their loads, and usually have been provided with two sets of springs. The first set of springs can suspend a load of about 4,000 lbs. per axle, and the second set of springs, overload springs, will take a loading of about 17,000 lbs. per axle. The use of two sets of springs creates at least two problems. First, when the truck is unloaded it will be supported on the smaller set of springs, but should it hit a bump the truck load will oscillate and drop down onto the 17,000 lb. springs with jarring effect. Therefore, the contents of a partially or almost unloaded truck will be given an extremely jarring and often damaging ride. This problem can be readily observed on the highways and in extreme cases the truck will hop or gallop with the wheels of the truck intermittently leaving the pavement.

Second, the use of two sets of springs may result in undesirable jarring even when the truck is fully loaded. That is, the truck may hit a bump and the load will oscillate up off the 17,000 lb. springs and will be supported only by the 4,000 lb. springs, which under heavy loading conditions provide virtually no support. The load will then fall back down on the 17,000 lb. springs which are very stiff. This combination of two sets of springs, therefore, can be seen to present a step function in its support of the load which is highly undesirable. Moreover, under optimum conditions, using the standard combination of springs, trucks have at best been able to achieve unloaded natural frequencies of about 350 cycles per minute, which, as was noted above, is just about that produced by the expansion strips in concrete freeways. As a result of resonance, the galloping or excessive bouncing induced by the other inadequacies of standard spring suspensions is further increased. Air suspension systems and torsion bars have been employed to provide non-linear suspension systems, but they are complex and expensive or too bulky and heavy for widespread use.

Most of these same problems exist in small pick-up trucks and even in station wagons. The solution in station wagons has been to provide standard car springs. The result has been that when fully loaded, the station wagon will be unnaturally depressed or lowered in the back end thereof.

All of the above-noted suspension problems in trucks and other vehicles are present in fifth wheel suspensions for trucks and trailers. In addition, a fifth wheel suspension particularly of the integral axle type provides substantially a point support in the front end of a truck trailer and this geometry creates further suspension problems. The fifth wheel, a support spring mounted on an axle and having a tow bar or mounted on the tractor portion of a truck at the rear thereof so that various trailers may be interchangeably connected and towed, will experience, in addition to normal reciprocation under uneven highway surfaces, roll and pitch of the trailer.

It is an object of the present invention to provide a vehicle suspension in which the suspending force is a continuous but non-linear function whereby the disadvantages hereinabove enumerated are eliminated and the suspended load has an improved ride throughout the full range of weight suspended.

Another object of the present invention is to provide a vehicle suspension which can accommodate and greatly improve the riding characteristics of loaded and unloaded vehicles wherein the vehicle has a low empty weight and a relatively high loaded weight.

Another object of the present invention is to provide a vehicle suspension suitable for adaptation to the axle of wheeled vehicles and suitable for use as a suspension for fifth wheel apparatus in trucks and trailers.

Another object of the present invention is to provide a vehicle suspension which can withstand and resist substantial rolling torque.

A further object of the present invention is to provide a fifth wheel suspension system which is easy and inexpensive to construct, is of greater strength than previous devices and is of much lighter weight.

The invention possesses other objects and features of advantage, some of which of the foregoing will be set forth in the following description of the preferred form of the invention which is illustrated in the drawing accompanying and forming part of the specification. It is to be understood, however, that variations in the showing made by said drawing and the description may be adopted within the scope of the invention as set forth in the claims.

Referring to said drawing (5 sheets).

There are two embodiments of the present invention illustrated in the drawing and reference will be made initially to the fifth wheel suspension of FIGURES 1 through 5 in discussion of common elements which are correspondingly numbered in FIGURES 6 through 8.

The vehicle suspension of the present invention comprises, briefly, laterally flexible means 11 terminally anchored for operation in tension, and means 12 supported medially thereon and coacting therewith to suspend the vehicle load whereby the vehicle load induces tension forces in the flexible means and lateral deflection thereof, and the increment of the lateral deflection will decrease for each increment of vehicle load.

The combination of a terminally anchored flexible means 11 and loading medially thereon by supporting means 12 creates a vehicle suspension which is non-linear. Such a nonlinear suspension system is particularly suitable for solving the above-noted problems in trucks and other wheeled vehicles. The effect of this non-linearity is to eliminate the step function problems encountered when two sets of springs are employed and yet be able to give a soft or good ride to an empty vehicle as well as to a fully loaded one. By way of illustration, one configuration of the present invention has a total of three inches of lateral deflection from unloaded to fully loaded conditions; however, the first twenty pounds of loading deflects the means 11 one inch, 4,000 lbs., unloaded weight, deflects the means 11 six inches and it takes a full 17,000 lbs. per axle on the supported means 12 to deflect the means 11 nine inches. Moreover, the natural frequency of the system will be as low as 90 to 100 cycles per minute when loaded.

It is preferable that in the vehicle suspension of the present invention the means 11 be a flexible tendon such as a cable, but the use of an elongated band or even diaphragm upon which the means 12 is medially supported will give the desired non-linear-deflection relationship which is highly desirable. Such means must be laterally flexible so that when they are terminally anchored they will function primarily in tension and not in bending in order that the initial resistance to lateral deflection is small. That is, when the means 11 operates in tension, it is distended between two anchoring points and is loaded medially, the lateral deflection is resisted only by the amount of elongation of the means 11 and not by the bending of the means. The non-linear load-deflection relationship results because the elongation of the means 11 is initially quite small for a substantial deflection from the unloaded position of the means. As the deflection increases, however, the elongation in the means 11 becoms substantial and thus the tension forces induced in the means 11 increase greatly. Ultimately, the elongation of the means 11 approaches and finally is substantially equal to the amount of lateral deflection of the flexible means, and, therefore, the supporting forces approach a linear relationship to the amount of deflection. Thus, the means 12, when loaded to produce a lateral deflection of the means 11, will induce tension forces in the flexible means 11 because of the elongation thereof, and these tension forces will initially be relatively low but rapidly become quite high causing the means 11 to act non-linearly but asymptotically approach a linear spring.

The means 12 supported medially on the flexible means can be provided with a surface 16 which engages the means 11 on deflection or can be in effect a link in the means 11. Preferably, and as here shown, the mounting of means 11 is provided by resiliently yieldable terminal anchoring means 13 and 14 which may be designed so as to substantially eliminate elongation of the means 11 and thereby eliminate problems of fatigue of the means 11 upon prolonged loading and unloading and reciprocation commonly encountered in vehicle suspension systems. The resiliently yieldable anchoring means can be conveniently designed to withstand fatiguing and yet will not interfere with the non-linear characteristics of the vehicle suspension. It is possible to provide only a single resilient anchoring means 13 at one end of the means 11 and secure the other end of the means 11 in fixed position.

Figure 2:
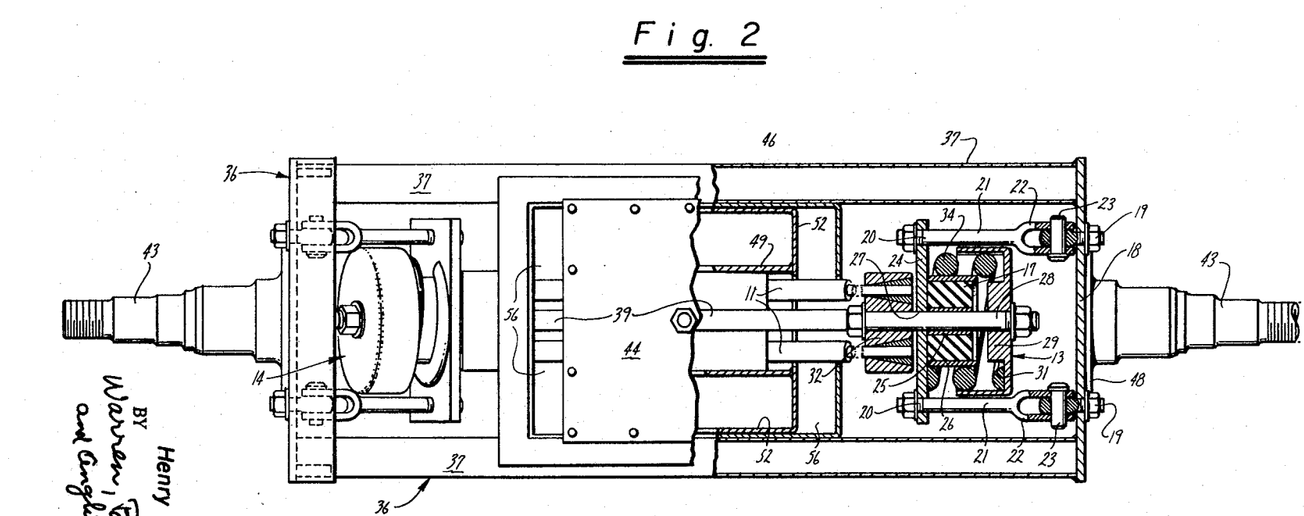
FIGURE 2 is a top plan view, in cross-section, taken along the line 2—2 of FIGURE 1.

The resiliently yieldable terminal anchoring means 13 and 14 are preferably provided with a rubber member 17, as is shown in FIGURE 2, mounted for compressive loading. As so mounted, the member 17 will be compressed upon lateral deflection of the means 11 to avoid elongation thereof and yet allow lateral deflection. It is, of course, possible to mount a rubber member for loading in tension.

The member 17 is mounted for compressive loading in the following manner. A fixed end wall 18, to which a cable 11 or other laterally flexible means is to be mounted, is provided with fasteners 19 to which a member 21 having a yoke-shaped end 22 is pivotally secured by the pin 23. A pair of members 21 extending from the end wall 18 have mounted on their ends 20 a member 24 having an internally protruding housing 26 which confines the member 17. The member 24 is provided with an opening 27 in the center thereof to accommodate for sliding reciprocation a bolt 28 which is threaded on both ends. On one end of the bolt 28 a cup-shaped member 29 is secured having a protrusion 31 which mates with the housing 26 for compressive loading of the member 17. The other end of the bolt 28 is provided with a cable securing member 32 having cable gripping devices 33 formed therein to receive and grip the cables 11. Various kinds of cable gripping devices are suitable for the present invention including those which employ soft zinc or grip a cable or tendon with a wedging type of action. Such fasteners or cable securing devices are well known in the art and need only be selected in order to withstand relatively high axial loads.

It is preferable to provide in addition to the rubber member 17, a coaxially mounted helical spring 34 which the member 29 also urges into compression against the member 24. In operation the resiliently yieldable terminal anchoring means provides for the elongation necessary for lateral deflection of the cable 11.

As a further feature of the present construction to better stabilize and distribute the load, a pair of cables 11 (see FIGURE 2) are provided under the member 12 and are secured at their ends in the cable gripping devices 33. Upon lateral deflection of the cables 11 the cable securing member 32 is urged or pulled away from the end wall 18. This urging is transferred through the bolt 28, which slidably passes through the member 24, and urges the cup-shaped member 29 away from the end wall 18 and toward the member 17. This compresses the spring 34 and eventually the rubber member 17 is compressed by the annular protrusion 31. The combination of a spring and axially mounted rubber pad creates a resiliently yieldable terminal anchoring means which will not fatigue and yet does not interfere with the non-linear characteristic of the vehicle suspension. The fact that there are two spring members, the helical spring 34 and the rubber pad 17, does not create the extreme and undesirable step function above-noted which is encountered in standard vehicle suspensions. This is true because if the cables 11 were secured to the end wall 18 without a resilient mounting the cable itself due to its resiliency would act as though it were a single spring; therefore, coaxially mounting two springs rather than relying on the resiliency of the cable itself does not significantly alter the basic principal upon which the present suspension system functions. Whatever minor discontinuities may exist from the use of coaxially mounted spring members are more than absorbed or eliminated by the characteristic of non-linearity resulting from the lateral loading of the cables. Other resiliently yieldable terminal anchoring means are suitable for the present invention including the use of a rubber pad alone or a helical spring alone, and their exact configuration will in large part depend upon the dimensions and weights involved in any given vehicle suspension.

The vehicle suspension system of the present invention is preferably provided with a frame, generally designated 36, to which a flexible tendon 11 is terminally anchored for operation in tension, and a load bearing member 12 is mounted medially thereon. Frame 36 and member 12 are here adapted for connection to a vehicle (not shown) and wheel supports 43 therefor whereby the vehicle load is carried by deflection of and tension forces in the tendon 11 and balancing supporting forces in the frame 36. The frame 36 is comprised of end walls 18 and rigid side structures 37 which secure the end walls in a fixed spaced relationship. The resiliently yieldable terminal anchoring means 13 and 14 are secured to the end walls 18 to distend the cable or flexible tendon member 11 therebetween for lateral deflection. Thus, the tension forces in the cable are transferred to the resiliently yieldable anchoring means 13 and 14 to the end walls which induce a balancing loading of the side structures 37. The side structures 37 may be formed of a plurality of vertically spaced channel members or other members designed to withstand the forces induced upon lateral loading of the flexible tendon. The yoke 22 and pin 23 are secured to end plates 18 by bolts 19 and provide a pivotal joint in the direction of the tendon deflection which permits articulation of these joints according to the deflection. These pivotal joints minimize the strain on the tendon 11 by eliminating any bending of the cable adjacent the cable securing devices 33.

Figure 1:
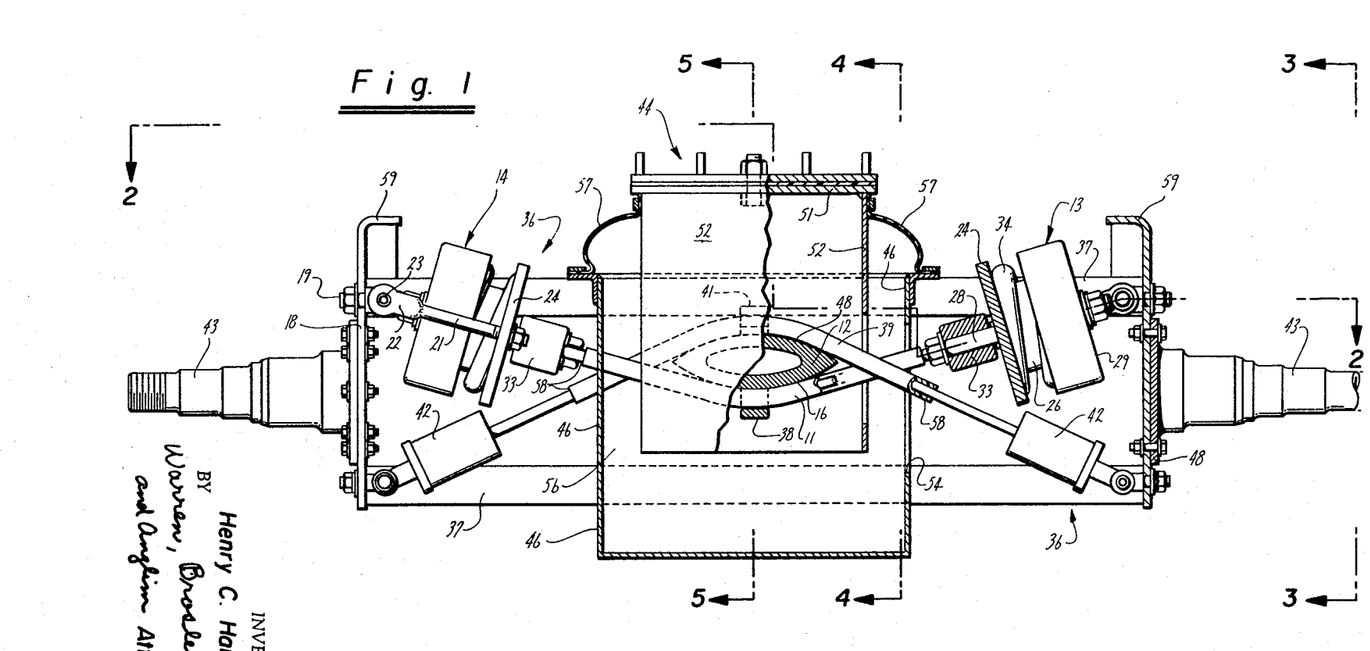
FIGURE 1 is a side elevational view, partially in cross-section, of a vehicle suspension for an integral axle fifth wheel constructed in accordance with the present invention.

The member 12 is preferably provided with a bearing surface 16 which is convex in a plane longitudinally of the tendon 11, as best may be seen in FIGURE 1. The convex configuration of the surface 16 of the member 12 increases the stability of the member 12 longitudinally of the tendon 11 and provides a substantial and increasing length of engagement of the tendon 11 with the surface 16 as a function of tendon deflection as the vehicle load is increased. As will be seen in FIGURE 1, the tendon 11 is in a relatively unloaded condition as the convex surface 16 is not engaged over its entire length with the tendon. If the loading of the member 12 were increased, the deflection of the member 11 would increase and it would come into engagement for a greater length with the surface 16. The increased engagement of the tendon 11 is important because it affords a greater bearing surface and therefore reduces the tendency to shear or locally strain a tendon 11 at the point of loading. Moreover, it is important that the distribution of the vehicle load through the bearing surface over a length of tendon is increased as a function of the increase in load. The importance of stability along the tendon will be discussed in detail below, but it can be seen that the stability along this axis is also increased with vehicle loading.

The stability of the member 12 may be further increased by providing a means 38 securing the tendon 11 and member 12 against relative displacement longitudinally of the tendon. The means 38 can best be seen in FIGURES 1 and 5 and comprises a hat-shaped clamp which is fastened over the tendon 11 to secure it against relative displacement. If only one end of the tendon 11 is resiliently anchored, it is undesirable to secure the tendon and member 12 against displacement as this would induce tipping along the tendon with deflection.

Figure 4:
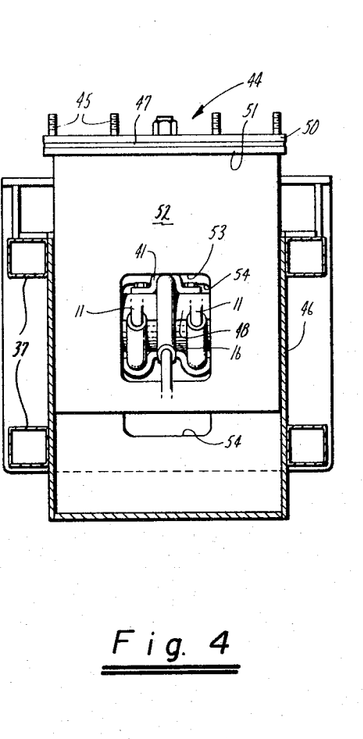
FIGURE 4 is an end view, in cross-section, taken on the line 4—4 of FIGURE 1.
Figure 5:
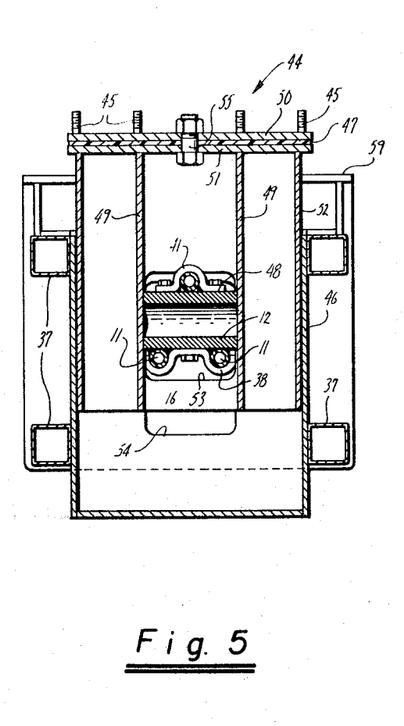
FIGURE 5 is an end view, in cross-section, taken on the line 5—5 of FIGURE 1.

Referring now to FIGURES 2, 4 and 5, it is preferable to provide a second flexible tendon and resiliently yieldable means terminally anchoring the second tendon to the frame 36 for operation in tension. As can be seen in FIGURE 2, the resiliently yieldable means functions to terminally anchor both the tendons 11 which pass under the member 12. The tendons are in substantially parallel spaced relation to each other and engage the member 12 on the surface 16 to provide spaced tendon supports therefor resisting rocking of the member 12 about the longitudinal axis of the tendons. The use of a pair of spaced tendons therefore resists rocking or tipping around the longitudinal axis of the tendons as opposed to rocking or tipping along the longitudinal axis of the tendon. A second tendon also serves to decrease the tension forces and bearing load on the first tendon thus giving greater flexibility in the choice of materials for the tendons and their size. Two spaced tendons can be provided by a single tendon secured at both ends to one of the end walls and looped down around an anchoring means on the other end wall (not shown). This has the advantage of eliminating one set of cable and securing devices 33.

In many applications it is highly advantageous to provide a second flexible tendon 39 terminally anchored to the frame 36 for operation in tension and engaging the member 12 in opposed relation to the first tendon 11 to resist deflection in a direction opposite to the load deflection of the tendon 11. As there is a tendency to have the load oscillate under dynamic conditions, a second tendon mounted to engage the member 12 in opposed relation to the member supporting tendon 11 will effectively dampen any tendency for the load to oscillate up off the load bearing tendon 11. As the tendon 39 operates on the same principle as the tendon 11, the force resisting upward or opposed motion to that motion deflecting the load bearing tendon will also be non-linear in its characteristics. Moreover, it is further advantageous to stabilize the member 12 against roll along the longitudinal axes of the cables to secure the cable 39 by the means 41 against relative longitudinal displacement. When both the tendons 39 and 11 are so secured, it will be seen that the rolling forces of the member 12 will be transferred into tension forces in the tendons and roll of the member 12 virtually will be eliminated. As is the case with the tendon 11, the tendon 39 can be fixedly secured to the end walls 18 of the frame 36. It is preferable, however, to connect the tendon 39 to the frame 36 by an energy dissipating means 42 which can most clearly be seen in FIGURE 1. The energy dissipating means 42 can be provided at one or both of the ends of the tendon 39 as may be required by the design of the vehicle suspension. The energy dissipating means 42 may consist of a standard vehicle shock absorber, dash-pot, or other device in which the movement of the tendon 39 along its longitudinal axis, due to lateral deflection by the member 12, is resisted or converted into work energy which limits or dissipates the motion of the member 12 in deflecting the tendon 39.

The present invention has been found to be particularly well suited for application to two types of vehicle suspensions. First, the present invention may be applied to fifth wheel vehicle suspnesions wherein a trailer is supported for steering or trailing behind a truck tractor. fifth wheel vehicle suspensions wherein a trailer is supthan other kinds of vehicle suspensions due to the fact that the trailer is in effect supported from a point in order to allow pivotal connection to the tractor so that the trailer will follow or trail the tractor. Second, the vehicle suspension of the present invention may be adapted for application to the suspension of vehicle axles or axle mounting means as contrasted to its use as a fifth wheel suspension.

An integral axle suspension here adapted for fifth wheel, is illustrated in FIGURES 1 through 5 and comprises briefly, a frame 36, wheel spindles 43 carried by an extending from opposite sides 18 of the frame 36, a flexible tendon 11 extending across the frame and being terminally anchored to the frame sides 18 for operation in tension, a fifth wheel mount 44 for a vehicle (not shown) including a load bearing member 12 mounted medially of the tendon 11 for vertical deflection thereof as a function of vehicle load, and guide means 46 connecting the frame and mount for relative vertical reciprocation. In the fifth wheel suspension the cable 11 passes under the member 12 and the member 12 carries the vehicle load while the frame 36 carries the wheel spindles. The converse is true in an axle type suspension which will be examined below. The fifth wheel suspension of FIGURES 1 through 5 is an integral axle fifth wheel, that is, the axle or wheel spindles are integrated with the fifth wheel suspension mount 44. As will be understood, the suspension system of the present invention may be applied to a fifth wheel converter dolly as used on the tractor-trailer truck. In either fifth wheel configuration, the trailer load will be non-linearly supported in the manner and with the attendant advantages of the present invention.

Figure 3:
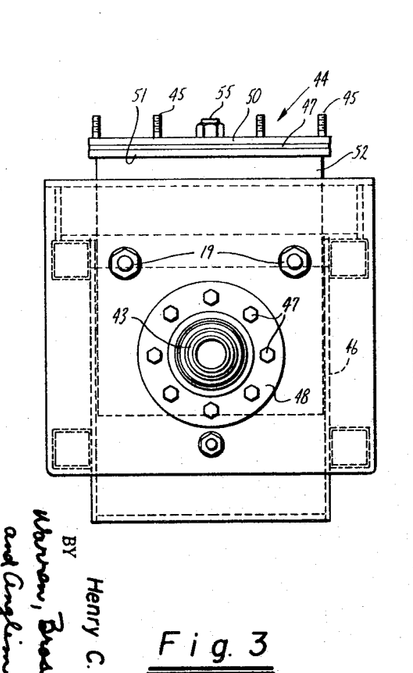
FIGURE 3 is an end elevational view taken on the line 3—3 of FIGURE 1.

Referring to the integral axle fifth wheel suspension in more detail, a pair of tendons 11 are terminally secured at both ends to resiliently yieldable mounting means 13 and 14 through the fasteners 19 to the end walls 18. It is preferable to provide a resiliently yieldable mounting means at each end of the tendons 11, however, such mounting means may be provided at one end only or even eliminated as explained above. The two tendons 11 pass beneath and support the member 12 through the bearing surface 16 which is convex in a plane along the longitudinal axis of the tendons. A second convex bearing surface 48 is also provided on the member 12. The member 12 is secured to an internal housing 49, which is best seen in FIGURES 2 and 5, which provides a constraint against lateral movement of the tendons 11 and is secured to the lower plate 51 of the mount 44. The mount 44 is comprised of an upper plate 50, to which upstanding bolts are secured to facilitate mounting of the vehicle on the plate 50, a bearing sheet 47, which is preferably Teflon, a lower plate 51, and a bolt or pin 55 which allows the upper plate 50 and vehicle to pivot relative to the lower plate 51 and thus the wheels. Secured to the plate 51 is a second housing 52 which is telescopically engaged with the guide means 46 for vertical reciprocation therewith. The housing 52 is provided with openings 53 in the sides thereof opposite the frame end walls 18 in order to allow the tendons 11 to clear the housing 52 and support the fifth wheel mount 44 only through the bearing surfaces 16 and 48. The openings 52 can best be seen in FIGURE 4. A second pair of openings 54 in the guide means 46 are provided in an aligned relationship with the openings 52. The openings 54 are of slightly larger vertical dimensions in order to allow relative vertical reciprocation of the housing 52 and guide means 46. As best may be seen by comparing FIGURES 1 and 2, the guide means 46 is in sliding engagement with the housing 52 in a plane parallel to the longitudinal axis of the tendons, but a cavity or space 56 is defined by the housing 52 and guide means 46 on the side of the housing 52 in a plane perpendicular to the longitudinal axis of the tendons. Thus, the guide means 46 constrains the housing 52 and therefore member 12 against deflection transversely of the longitudinal axis of the tendon but does not constrain the member 12 against roll along the longitudinal axis of the tendon. This construction allows the trailer body to be tipped toward one wheel spindle or the other a substantial distance without inducing bending moments in the frame 36. Should one side of either the rear or fifth wheel mounted wheel drops into a chuck hole or similar depression in the highway the bed of the trailer and thus fifth wheel mount 44 will be correspondingly tipped or inclined to the frame 36 and particularly the frame side structures 37. If the housing 52 were in sliding engagement with the guiding means 46, the relative tipping would be transferred to the frame side structure 37 to which the guide means 46 is fixedly mounted. In this event, the side structure would have to be designed to withstand bending forces as well as axial compression and tension forces due to the cable loading. In order to withstand both bending and compression forces the side structure 37 would have to be much heavier and more expensive than is possible when the construction of the present invention is used. The clamps 38 and 41 which clamp the cables 11 and 39 to the member 12 and the convexed relative tipping of the mount 44 to the frame 36 into tension forces in the tendons. These tension forces are correspondingly transferred to the end plates 18 which compressively load the side structures 37 (the loading of the side structures may also be in tension depending upon the exact relative location of the cable anchoring means and the spindles), and thus the side structures 37 need only be designed to withstand tension or compression forces and not bending moments. Thus, as best seen in FIGURES 3, 4 and 5, the side structures 37 can be made of a hollow channel-shaped construction which has good tensile and compressive characteristics and yet is light weight and easy to manufacture. A flexible rubber or cloth dust cover 57 is secured to the housing 52 and means 46 so as to allow full vertical reciprocation of the two members and yet prevent extraneous matter from falling into the cavity 56.

The tendons 39 and 11 may be constructed from wire rope cables or a single strand of wire or other material which is laterally flexible and yet has requisite strength in tension. Where the tendons engage the surfaces 16 and 48 it is preferable to provide them with an abrasion resistant covering 58 which prevents damage or weakening of the tendons under the repeated engagement and disengagement of the tendons and the surfaces during vibration and bouncing of the vehicle during motion.

It is preferable in the fifth wheel vehicle suspension to construct the frame sides or ends 18 to directly support the vehicle upon failure of the tendon. One method of doing this is to provide L-shaped extensions 59 to the frame sides or ends 18. Should the tendons 11 fail in tension, the fifth wheel mount 44 will drop down into the guide means 46 thus affording no support to the vehicle load. The vehicle, however, instead of falling down on the side structures 37 and thereby inducing bending moments therein, will come to rest on the L-shaped extensions 59 which will virtually eliminate loading the side structures 37 in bending and instead will load the ends 18 and the spindles 43 in bending which they are designed to take. The ends 18 may be constructed so as to prevent the vehicle load from being transferred intermediately thereof to the side structures 37 in several manners which, of course, will depend upon the structure and dimensions of the vehicle being supported. As was noted above, the ability to avoid inducing bending moments in the side structures 37 intermediately of the ends 18 allows the side structures and thus the entire vehicle suspension to be of much lighter weight than previous vehicles. For example, a fifth wheel suspension, of the type as shown in FIGURE 1, may be constructed with an overall weight of about 250 lbs. which is far less than standard fifth wheel structures. The tendons in the present structure because of their resilient mounting are required to elongate only about 1/16 inch thereby avoiding fatigue. The natural frequency of this suspension system is a function of the length of the tendon, the pretensioning thereof and the rubber-spring constants, but the optimum natural frequency of this suspension is about 90 cycles per minute. This is about 1/4 of that of standard suspension systems and is very close to the natural frequency of automobiles.

With regard to the pretensioning of the tendons, the tendon 39 can be used to pretension or load the tendons 11 in order to minimize the relative vertical reciprocation of the housing 52 and guide means 46 and therefore the vertical height required for the guide means housing in order to accommodate this reciprocation. Alternatively, the tendons 11 may be mounted in tension. Pretensioning may be done in either manner without materially impairing the non-linear characteristics of the suspension system.

Figures 6, 9:
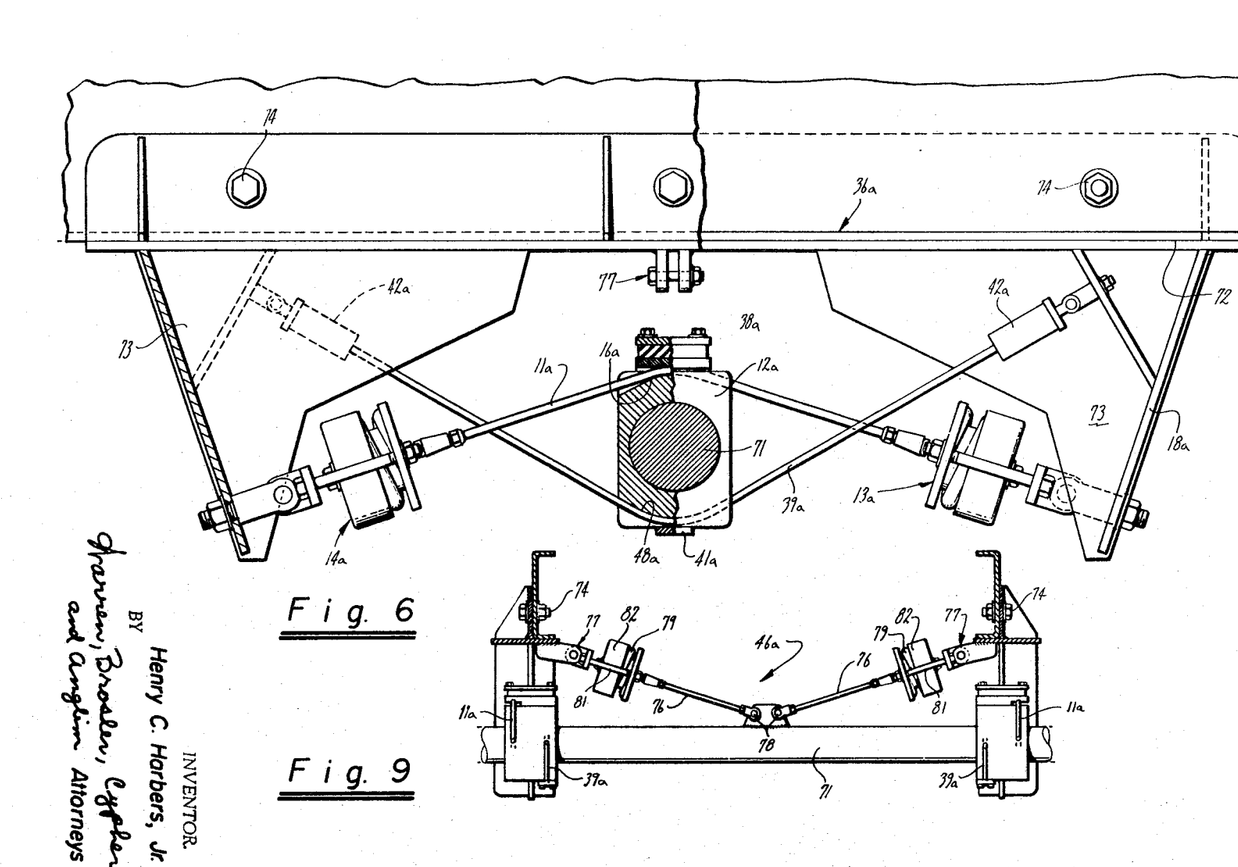
FIGURE 6 is a fragmentary side elevational view, partially in cross-section, of a vehicle suspension for a standard vehicle axe constructed in accordance with the present invention.
FIGURE 9 is a reduced end view partially in cross-section of the vehicle suspension of FIGURE 6.
Figures 7, 8:
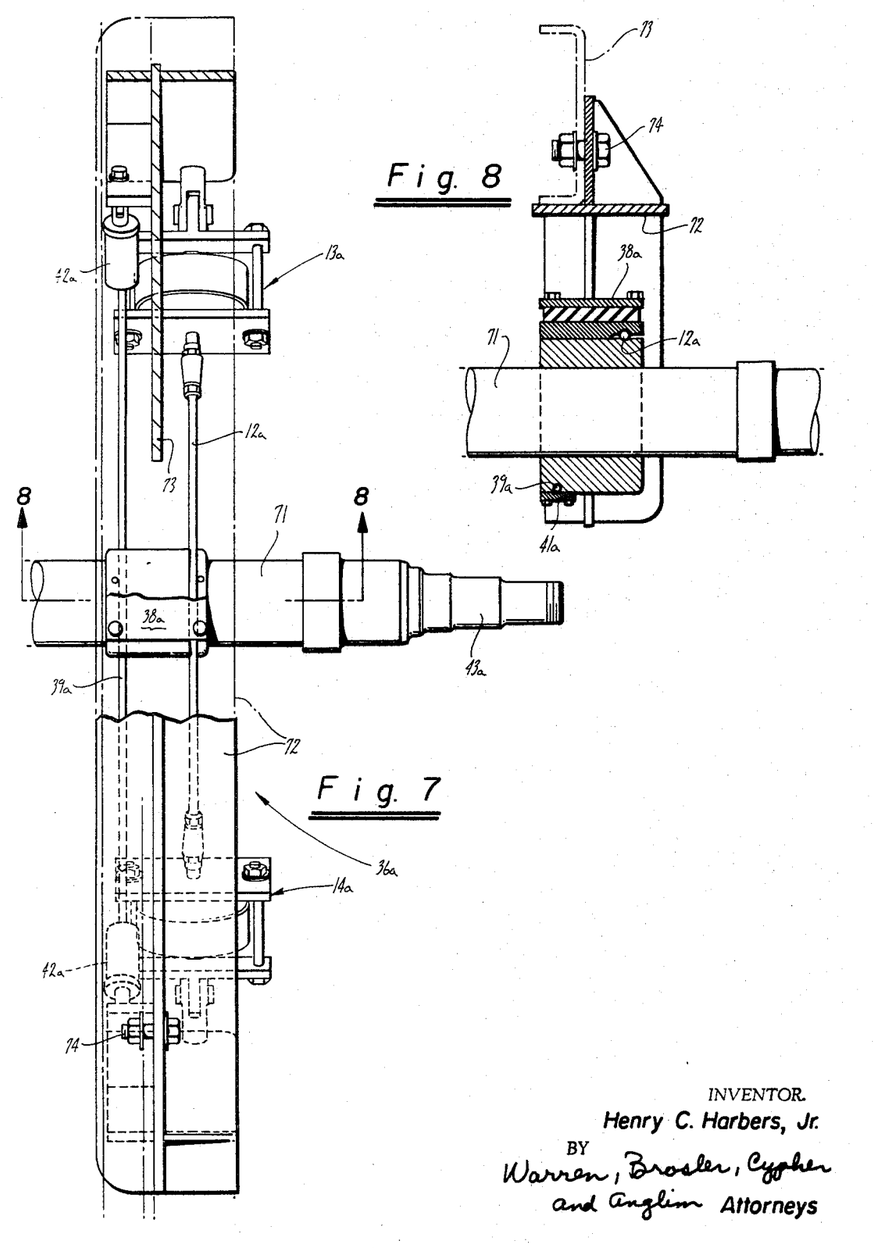
FIGURE 7 is a top plan view of the vehicle suspension of FIGURE 6.
FIGURE 8 is a side elevational view, in cross-section, taken on the line 8—8 of FIGURE 7.

FIGURES 6, 7 and 8 illustrate an adaptation of the vehicle suspension of the present invention to the suspension of a standard axle 71 for the front or rear wheels of a vehicle. The components of the axle suspension are the same as that of a fifth wheel suspension as has been described above with the exception that the frame 36a supports the vehicle load directly on it instead of on the member 12a, here integral with axle 71, which carries the wheel spindles 43a and thus the wheels. The member 12a may still be described as the load bearing member in that it now carries the vehicle load through the tendon and loads the tendon medially of the tendon anchorages to the frame. In an axle suspension, the tendon 11a is, therefore, urged upwardly and passes over the member 12a. The tendon 12a is, however, mounted to frame ends 18a, is secured against relative motion with the member 12a by the securing means 38a and is resiliently anchored by the means 13a and 14a. A second cable 39a and energy dissipating means 42a may also be provided to oppose the action of the cable 12a. Tendon 11a is resiliently mounted to the end structures 18a which are cantilevered to the base 72 of the frame 36a which in turn is secured to the chassis or truck frame 73. The frame ends 18a are reinforced by the webbing plate 73 which transmits bending forces to the frame base 72. Unlike the fifth wheel suspension frame, the axle suspension frame will induce substantial bending forces, but the frame weight is not as critical and a heavy truck chassis 73 will be available to reinforce and strengthen the suspension frame. The fasteners 74 are provided to secure the frames 36a and 73 in fixed relationship whereby vehicle load can be transmitted through the cable 11a to the axle 71 and the wheel supports. It is possible, however, to construct the rear axle suspension in a manner analogous to the fifth wheel suspension whereby the frame is loaded in compression and tension forces and not bending forces.

It will be understood that forces in the direction of the axis of the axle 71 will produce a corresponding deflection in that direction which would be undesirable. Therefore guide means 46a are provided to constrain movement along this axis. Guide means 46a are comprised of a pair of cables or tendons 76 secured at the ends 77 to the frame base 72 and at the ends 78 to the axle 71. The tendons are provided with a resilient member 79 which can be constructed in substantially the same manner as are the resilient cable anchoring means 13 and 14. That is, one side of the cable will be attached to a yoke 81 which has a central opening therein to allow a T-shaped member 82 on the other side of the cable to reach through and grab the other side of the resilient member 79 so that when the cables are placed in tension the resilient member 79 is placed in compression. The use of these opposed tendons 76 limits the axial movement of the wheels and yet does not substantially affect the non-linear vertical suspending force provided by the tension 11a.

I claim:

1. A vehicle suspension comprising, a frame, wheel spindles carried by and extending from opposite sides of said frame, a flexible tendon extending across said frame and being terminally anchored to said frame sides for operation in tension, a fifth wheel mount for a vehicle including a load bearing member mounted medially of said tendon for vertical deflection thereof as a function of vehicle load, and guide means connecting said frame and mount for relative vertical reciprocation.

2. A vehicle suspension as defined in claim 1 wherein said frame sides are constructed to directly support said vehicle upon failure of said tendon.

3. A vehicle suspension comprising, laterally flexible means, resiliently yieldable terminal anchoring means anchoring said flexible means for operation in tension, said anchoring means having a variable spring constant, and means supported medially on said flexible means and co-acting therewith to suspend the vehicle load.

4. A vehicle suspension comprising, laterally flexible means, resiliently yieldable terminal anchoring means anchoring said flexible means for operation in tension, and means supported medially on said flexible means and coacting therewith to suspend the vehicle load, said anchoring means being formed for a variable increment of deflection per increment of vehicle load as a function of the total deflection of said anchoring means.

5. A vehicle suspension as defined in claim 4 wherein said anchoring means is formed to have a decreased deflection per increment of vehicle load as the total deflection of said anchoring means increases.

6. A vehicle suspension as defined in claim 4 wherein said anchoring means is formed to have a decreased deflection per increment of vehicle load after a predetermined total deflection of said anchoring means.

7. A vehicle suspension as defined in claim 6 wherein said terminal anchoring means includes a first spring member mounted to resist initial deflection of said anchoring means and a rubber spring member mounted for compressive loading after a predetermined deflection of said first spring member.

8. A vehicle suspension comprising, a frame a flexible tendon terminally anchored to said frame for operation in tension, a load bearing member mounted medially on said tendon and coacting therewith to suspend the vehicle load, and a second flexible tendon terminally anchored to said frame for operation in tension and for engagement of said member in opposed relation to said first-named tendon to resist deflection in a direction opposite to said load deflection.

9. A vehicle suspension as defined in claim 8 and resiliently yieldable terminal anchoring means connecting said first-named and second-named tendons and said frame.

10. A vehicle suspension as defined in claim 9 wherein said anchoring means has a variable spring constant.

11. A vehicle suspension as defined in claim 9, and an energy dissipating means connecting said second tendon to said frame to transfer loading of said second tendon to said frame.

References Cited

UNITED STATES PATENTS

| 2,420,276 | 5/1947 | Wood | 267—71 X |
| 3,208,765 | 9/1965 | Madden | 280—124 |

BENJAMIN HERSH, *Primary Examiner.*

PHILIP GOODMAN, *Examiner.*